Patented Jan. 27, 1931

1,790,474

UNITED STATES PATENT OFFICE

MINER L. HARTMANN, OF LOMPOC, CALIFORNIA, ASSIGNOR TO THE CARBORUNDUM COMPANY, OF NIAGARA FALLS, NEW YORK, A CORPORATION OF PENNSYLVANIA

SILICON-CARBIDE REFRACTORY ARTICLES AND METHOD OF MAKING THE SAME

No Drawing. Application filed February 4, 1927. Serial No. 166,028.

My invention relates to an improvement in refractory articles, such as bricks, furnace linings, etc. formed principally of silicon carbide.

Silicon carbide has well known refractory properties and has been used extensively for this purpose both in the form of recrystallized pure silicon carbide, as for example described in Tone U. S. Patents 992,698 and 1,013,700; also in the form of silicon carbide articles bonded by various ceramic bonding materials, such as clay, zirconium silicate, aluminum silicate, etc. as illustrated in Tone U. S. Patent 1,204,211, Hartmann U. S. Patent 1,524,030 and Geiger U. S. Patent 1,546,833. While the refractory material therein described has been satisfactory to a certain extent, it has been found that the silicon carbide in all of these refractory materials is oxidized in use to silica with considerable rapidity. Since the silica thus produced occupies a larger space than the silicon carbide grain from which it is formed, there is an expansion within the article and a consequent structural weakening. This defect in silicon carbide refractories has heretofore considerably limited its usefulness because of the relatively short life under certain furnace conditions.

I have discovered that silicon carbide is oxidized to silica with great rapidity when in the presence of certain materials, such as the oxides or salts of the easily reducible metals falling below manganese in the electrochemical series. The principal materials having this catalytic action, which I have discovered are iron, copper, zinc, titanium, and tin or salts of these metals. In order, therefore, to decrease the rate of oxidation of silicon carbide in refractories during burning and subsequent use in furnaces, I have found that it is desirable to use materials which are practically free from these elements, particularly iron and iron compounds. By thus eliminating the presence of these compounds in the burned refractory articles, I have greatly increased the life of the silicon carbide refractories so that their use is greatly extended in industrial furnaces. I have found that this effect is practically independent of the bonding agent which is used; that the presence of any of these compounds, particularly any compound of iron, whether with the silicon carbide or in the bonding agent, causes a much accelerated rate of oxidation of the silicon carbide.

For example, I have observed that silicon carbide grain heated to about 1400° C. in the presence of as little as 3% of iron oxide is oxidized at a rate five times as great as the same material free from iron oxide. I believe that this catalytic action is further accelerated by varying temperatures, for it is well known that iron in some of its higher oxidized forms, as for example $Fe_2O_3$, is unstable above temperatures of about 1350° C. as it liberates free oxygen and is changed to the ferrous condition as represented by the compound $FeO$. It is a possible explanation of the accelerated oxidation that the oxygen, which is liberated by this transformation, attacks the silicon carbide to form the oxide of silica and the higher oxide of iron is again reformed by lowering temperature or change of pressure. I have also found that varying conditions of the furnace atmosphere from oxidizing, neutral and reducing, also accelerate the rate of oxidation of silicon carbide in the presence of iron compounds and that all of these factors tend to hasten the disintegration of the silicon carbide refractory by the production of silica, with consequent swelling of the shape.

To take advantage of my discovery in the production of an improved silicon carbide refractory, I prefer to use silicon carbide grain crushed to 14 and finer, the grit sizes being so distributed that maximum packing density is secured. This silicon carbide must then be thoroughly cleaned from all these catalyzing compounds including those of iron or metallic iron. This purification can be accomplished in well known ways, such as magnetic treatment and removal by acid. I prefer to use grain which has less than 0.5% iron oxide remaining in it. To 90 parts of this I add a bonding material, for example, about 8 parts of high purity kaolin and 2 parts of feldspar, which are substantially free from compounds of iron and other readily reducible metals. The silicon carbide grains and the bond are then mixed thoroughly using sufficient water to get proper molding consistency, pressed into a mold of the desired shape, dried and fired in a ceramic kiln according to well known practices.

That this fact has not been previously recognized is evident from the chemical analysis of silicon carbide refractory articles which are known and marketed today, as shown below:

|  | Per cent Fe₂O₃ | Per cent SiO₂ | Per cent SiC |
|---|---|---|---|
| Sample 1 | 1.09 | 19.27 | 75.42 |
| Sample 2 | .61 | 29.94 | 67.16 |
| Sample 3 | 1.30 | 13.23 | 80.20 |
| Sample 4 | .98 | 19.90 | 78.20 |
| Sample 5 | 2.66 | 31.98 | 42.77 |
| Sample 6 | 1.69 | 31.03 | 47.71 |
| Sample 7 | .91 | 17.53 | 71.38 |
| Sample 8 | 1.30 | 9.00 | 88.00 |
| Sample 9 | 1.50 | 18.59 | 77.65 |

While there is no parallelism between the iron oxide content and the silica content, the analyses do show that the silicon carbide refractories on the market today contain a considerable quantity of iron compounds and also silica, most of the latter being produced during the burning operation.

I have further demonstrated the deleterious effect of even small quantities of iron or iron oxide, due to the accelerated production of silica from silicon carbide, by oxidation in the making of vitrified ceramic bonded silicon carbide bricks containing about 90% silicon carbide and various bonding agents, the only difference being in the percentage of iron or iron oxide contained in the silicon carbide. After firing in a ceramic kiln, I find, for example, in one case that a refractory body containing .09% iron compounds (reported as Fe₂O₃) increased in silica (due to oxidation of silicon carbide) 5.3%; another example containing .27% Fe₂O₃ increased in silica content 10.9%, while a third sample .37% iron oxide increased in silica content 11%. It is obvious, therefore, that the iron oxide content of the silicon carbide must be extremely low to prevent this undesirable oxidation.

While I have illustrated my invention by the use of one particular type of bond, that is kaolin and feldspar, I do not restrict myself to this bond, nor to the given proportions nor the exact details of manufacture as given in this application, my improved product being dependent upon the discovery that the absence of iron or iron compounds or other compounds of metals which are readily reducible, is decidedly advantageous in silicon carbide refractories in greatly decreasing the rate of oxidation and consequent disintegration of the refractory.

I claim:

1. A refractory article comprised of silicon carbide grains which have been treated to remove substantially all catalytic substances capable of accelerating the oxidation thereof and which are inherent to the silicon carbide, and a heat resistant bond uniting the particles and serving to minimize the permeability thereof.

2. A refractory article of silicon carbide capable of withstanding oxidizing conditions at high temperatures comprising silicon carbide containing less than 1% of iron or other catalytic substance and a bond also substantially free of iron and any other catalysts capable of accelerating the oxidation of the silicon carbide, the said bond cementing the silicon carbide particles and protecting the carbide particles against exposure to oxidizing gases.

3. A refractory article capable of withstanding oxidizing conditions at high temperatures comprised of granular silicon carbide substantially free of those easily reducible metals and the compounds thereof falling below manganese in the electro-chemical scale, and which compounds have a catalytic effect in accelerating the oxidation of silicon carbide, and a clay bond also substantially free of similar catalytic substances, said bond serving to reduce the permeability of the article and thereby protect the silicon carbide grains from exposure to oxidizing gases.

4. A refractory article capable of withstanding oxidizing conditions at high temperatures comprising granular silicon carbide free of iron in any form appreciably in excess of .5%, and a bond of kaolin clay and feldspar, the bond also being substantially free of iron in any form.

5. The method of treating silicon carbide to increase its resistivity to oxidizing conditions at high temperatures, which comprises freeing silicon carbide of iron in any form appreciably in excess of .5%, mixing the grain with a bond capable of protecting the grain from oxidation and adapted to reduce the permeability of the article, forming the mix into shape and firing the shaped form.

6. The method of treating commercial silicon carbide to increase its resistivity to oxidizing conditions at high temperatures which comprises effecting the removal from the silicon carbide of the inherent compounds of easily reducible metals falling below manganese in the electro-chemical series and capable of accelerating the oxidation of silicon carbide at high temperatures, mixing the grains with a bond containing kaolin clay and feldspar, which bond is also free of said catalytic materials and which is capable of reducing the permeability of the article to penetration by oxidizing gases, and firing the shaped form.

7. A refractory article capable of withstanding oxidizing conditions at high temperatures comprising granular silicon carbide containing less than 5% of iron in any form, and a substantially non-ferrous bond of kaolin clay and feldspar.

In testimony whereof I have hereunto set my hand.

MINER L. HARTMANN.